(12) United States Patent
Huizenga

(10) Patent No.: US 10,817,486 B2
(45) Date of Patent: Oct. 27, 2020

(54) CONTAINMENT OF DATA STRUCTURES WITH DATA OBJECTS IN DATA MODELING TOOLS

(71) Applicant: Idera, Inc., Houston, TX (US)

(72) Inventor: Ron Huizenga, Okotoks (CA)

(73) Assignee: Idera, Inc., Houston, TX (US)

( * ) Notice: Subject to any disclaimer, the term of this patent is extended or adjusted under 35 U.S.C. 154(b) by 124 days.

(21) Appl. No.: 15/659,896

(22) Filed: Jul. 26, 2017

(65) Prior Publication Data

US 2018/0032551 A1    Feb. 1, 2018

Related U.S. Application Data

(60) Provisional application No. 62/367,165, filed on Jul. 27, 2016.

(51) Int. Cl.
| | | |
|---|---|---|
| *G06F 16/21* | (2019.01) | |
| *G06F 16/25* | (2019.01) | |
| *G06F 16/28* | (2019.01) | |
| *G06F 16/26* | (2019.01) | |

(52) U.S. Cl.
CPC .......... *G06F 16/212* (2019.01); *G06F 16/258* (2019.01); *G06F 16/26* (2019.01); *G06F 16/288* (2019.01); *G06F 16/284* (2019.01)

(58) Field of Classification Search
CPC ...... G06F 16/212; G06F 16/26; G06F 16/258; G06F 16/288; G06F 16/284; G06F 16/1794
See application file for complete search history.

(56) References Cited

U.S. PATENT DOCUMENTS

| | | | | |
|---|---|---|---|---|
| 5,533,148 A | * | 7/1996 | Sayah | ................. G06F 17/5081 |
| | | | | 382/240 |
| 7,185,016 B1 | * | 2/2007 | Rasmussen | ............ G06Q 10/10 |
| 7,483,882 B1 | * | 1/2009 | Bumgarner | ........... G06F 9/4493 |

(Continued)

FOREIGN PATENT DOCUMENTS

GB         2555895 A     5/2018

OTHER PUBLICATIONS

Requisition by the Examiner in Accordance with Subsection 30(2), dated Jun. 14, 2018, Canadian Patent Application No. 2973811, pp. 1-6.

(Continued)

*Primary Examiner* — Jorge A Casanova
(74) *Attorney, Agent, or Firm* — Kent B. Chambers; Terrile, Cannati & Chambers, LLP

(57) ABSTRACT

A data object design system and method facilitates and generates creation of data objects to contain and, thus, contain data structures within the data objects. The data objects and interaction between the data objects implement a higher level of abstraction between data objects and data entities. Particularly for complicated, sophisticated data models, the data objects support an increased usability, efficiency, and comprehension of a data modeling system. Thus, in at least one embodiment, the data object design system and method increases the technical capabilities of data modeling tools by, for example, implementing data objects to reduce complex data modeling implementations into manageable data objects and increasing the efficient utilization of data modeling tools.

20 Claims, 15 Drawing Sheets

(56) References Cited

U.S. PATENT DOCUMENTS

| | | |
|---|---|---|
| 7,822,587 B1 | 10/2010 | Krimstock et al. |
| 9,307,884 B1* | 4/2016 | Coleman ............... G06Q 40/00 |
| 2010/0174720 A1* | 7/2010 | Mack ..................... G06F 16/21 |
| | | 707/741 |
| 2013/0238659 A1* | 9/2013 | Roitman ............. G06F 21/6227 |
| | | 707/781 |
| 2018/0032551 A1 | 2/2018 | Huizenga |

OTHER PUBLICATIONS

Combined Search Report under Section 17(5)(b) and Abbreviated Examination Report under Section 18(3) dated Jan. 11, 2018, mailed in Application No. GB1711628.6, pp. 1-6.

Response to the Combined Search Report under Section 17(5)(b) and Abbreviated Examination Report under Section 18(3) dated Jan. 11, 2018, as filed in Application No. GB1711628.6 on Sep. 28, 2018, pp. 1-13.

Requisition by the Canadian Intellectual Property Office Examiner in Accordance with Subsection 86(2) of the Patent Rules dated May 25, 2020, filed in Canadian Application No. 2,973,811, pp. 1-7.

* cited by examiner

CONTAINMENT OF DATA STRUCTURES WITH DATA OBJECTS IN DATA MODELING TOOLS

BACKGROUND

Field of the Invention

The present invention relates in general to the field of databases and more specifically to data structures and data objects to contain data structures in data modeling tools.

Description of the Related Art

Electronic databases have become ubiquitous in the environment of information processing. A database is an organized collection of data. The data is typically organized in accordance with a data model designed by a data modeler. A data entity is a basic data structure created by a data modeler, and the data modeler interrelates the data entities to create a data model.

FIG. 1 depicts an exemplary data model 100 that includes two data entities 102 and 104. A data entity in general is a data structure that captures data representing characteristics about an entity. The data entity captures the characteristics in the form of attributes and/or relationships. Data entity 102 is identified by and captures data about ENTITY_0, and data entity 104 is identified by and captures data about ENTITY_1. Each of the data entities 102 and 104 include exemplary, respective attributes ATTRIBUTES_0 and ATTRIBUTES_1. The exemplary one-to-many relationship symbol 106 indicates a one-to-many relationship between data entity 102 and data entity 104. The actual data entity name, attributes, and relationship are matters of design choice. For example, in a computer manufacturing environment, data entity 102 could be a motherboard with various components, such as central processing units and memory devices, as attributes. Data entity 104 could be components for a motherboard that includes central processing unit and memory device pairs.

FIG. 2 depicts an exemplary supplier/order data model 200 with data entities 202-230. Data entity 202 is a Purchase Order data entity with a Purchase Order number integer attribute, a date/time Purchase Order Date, and a Supplier ID integer, foreign key attribute. The data entity 202 has a many-to-one relationship 230 with a Supplier data entity 204, and the Supplier data entity 204 has attributes of an integer Supplier ID and a variable character Supplier Name. Each of the remaining data entities 206-230 also includes attributes and relationships with other data entities. Together, the data model 200 organizes the data used implement a supplier/order system. With fifteen data entities, data model 200 represents a more complicated data model relative to data model 100. In at least one embodiment, specialized types of relationships exist between entities, referred to as a supertype relationship or a subtype relationship. A subtype entity extends a specification of a supertype. For example, entity 212 (Item) is a supertype, and entities 210 (Purchase Item) and 214 (Manufacture Item) are subtypes that extend the specification of the entity 212. In at least one embodiment, each instance of a subtype has a corresponding supertype instance.

FIG. 3 depicts a data model 300 that includes N data entities, where N is an integer of any value greater than two. The ellipses indicate that data model 300 can grow to a very large size of, for example, dozens, hundreds, or thousands of data entities with corresponding numbers of attributes and relationships.

Data modelers (including data architects) design data models and the resulting databases using data entities and attributes (logical models) and/or tables and columns (physical models), thereby creating database designs and associated metadata in data models. This practice is founded on conventions established in the 1960's for entity-relationship (ER) diagramming to design relational databases. Thus, for many years, the data models, such as database models 100, 200, and 300, have been the primary means of communicating database designs to programmers, developers and application architects in order to design and build applications utilizing those databases.

However, as a data model becomes more complicated, understanding, editing existing data entities, removing data entities, and adding data entities becomes more difficult. As the difficulty increases, the particular expertise and familiarity level of the data modeler also increases.

SUMMARY

In one embodiment of the present invention, a method of utilizing a data modeling tool executing in a machine to generate data objects to contain data entities within the data objects of a data modeling system. The method includes: (a) selecting a first data entity for containment within a data object, wherein the data entity includes data entity definitions comprising entity information about the entity represented by the data entity, an identifier, and relationship information representing a relationship with at least one other data entity and (b) capturing the first data entity, including the data entity definitions included with the first data entity, in the data object to contain the first data entity within the data object. The method further includes repeating (a) and (b) at least once to add one or more data entities to the data object and generate one or more additional data objects, preserving in each data object relationships between data entities captured in each data object, and translating the data objects into data structures for storing in a database.

In another embodiment of the present invention, a data modeling system of a database includes a processor and a memory, coupled to the processor, that includes code executable by the processor to generate a data modeling tool that is configured to:
(a) receive a selection of a first data entity for containment within a data object, wherein the data entity includes data entity definitions comprising entity information about the entity represented by the data entity, an identifier, and relationship information representing a relationship with at least one other data entity;
(b) capture the first data entity, including the data entity definitions included with the first data entity, in the data object to contain the first data entity within the data object;
repeat (a) and (b) at least once to add one or more data entities to the data object and generate one or more additional data objects;
preserve in each data object relationships between data entities captured in each data object; and
translate the data objects into data structures for storing in a database.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A data object design system and method facilitates and generates creation of data objects to contain and, thus, contain data structures within the data objects for, for example, design of a database. The data objects and interaction between the data objects implement a higher level of abstraction between data objects and data entities. Particularly for complicated, sophisticated data models, the data objects support an increased usability, efficiency, and comprehension of a data modeling system for a database. Thus, in at least one embodiment, the data object design system and method increase the technical capabilities of data modeling tools by, for example, implementing data objects to reduce complex data modeling implementations into manageable data objects and increasing the efficient utilization of data modeling tools. In at least one embodiment, the data object design system and method increases the technical capabilities of data modeling tools by, for example, allowing data modelers to conceptualize design data models, especially complex and sophisticated data models, at a higher level of abstraction, using the data objects and the interaction between those data objects, rather than focusing on or even necessarily understanding tables underlying the data model and relationship constraints in the underlying database(s). In at least one embodiment, the data object design system and method introduce new technical capabilities within a data modeling tool to also provide new data model diagramming and metadata constructs to represent the combined perspectives of both data modelers and database architects.

Figure 4:
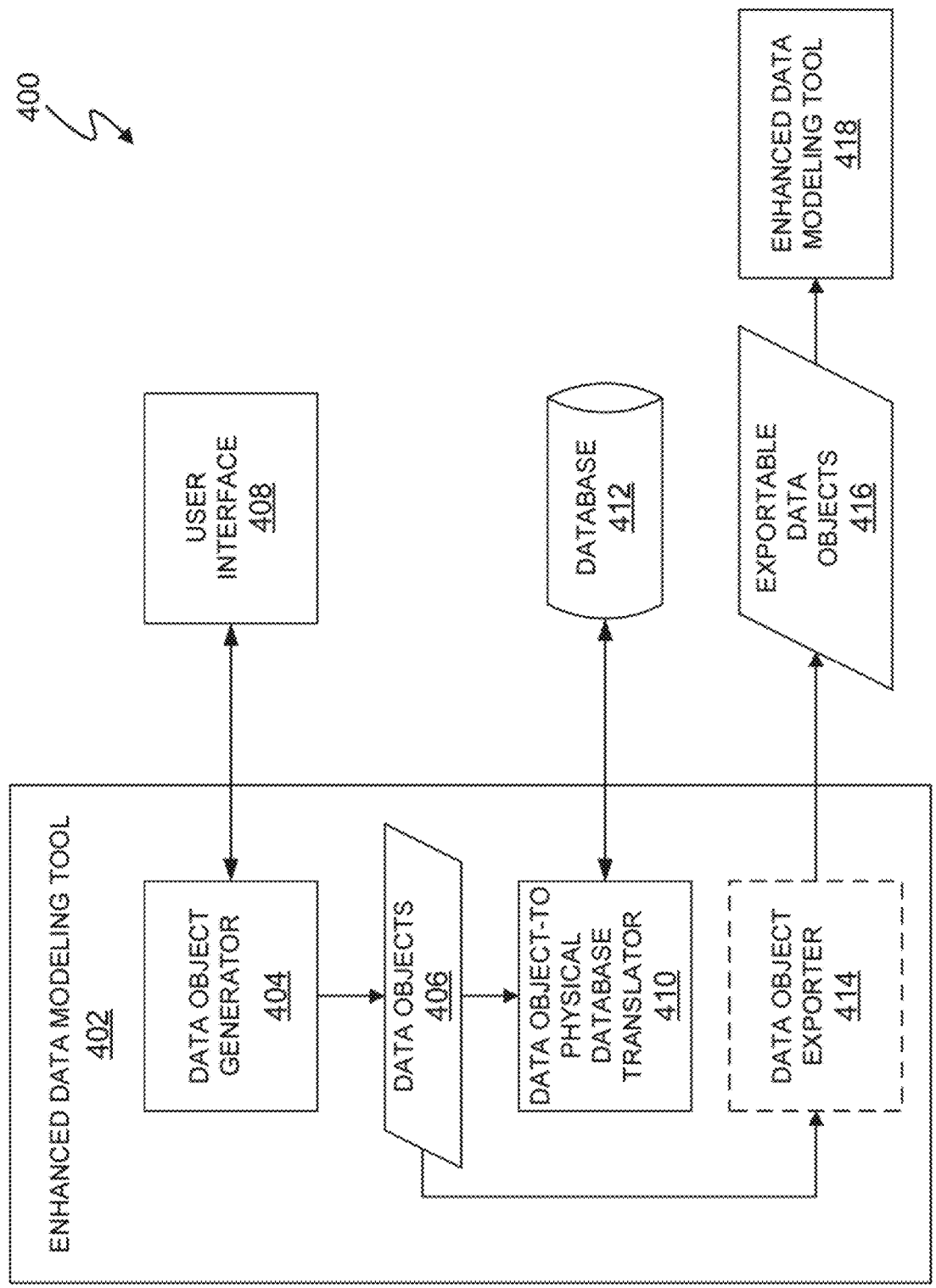
FIG. 4 depicts an exemplary data object design system.
Figure 5:
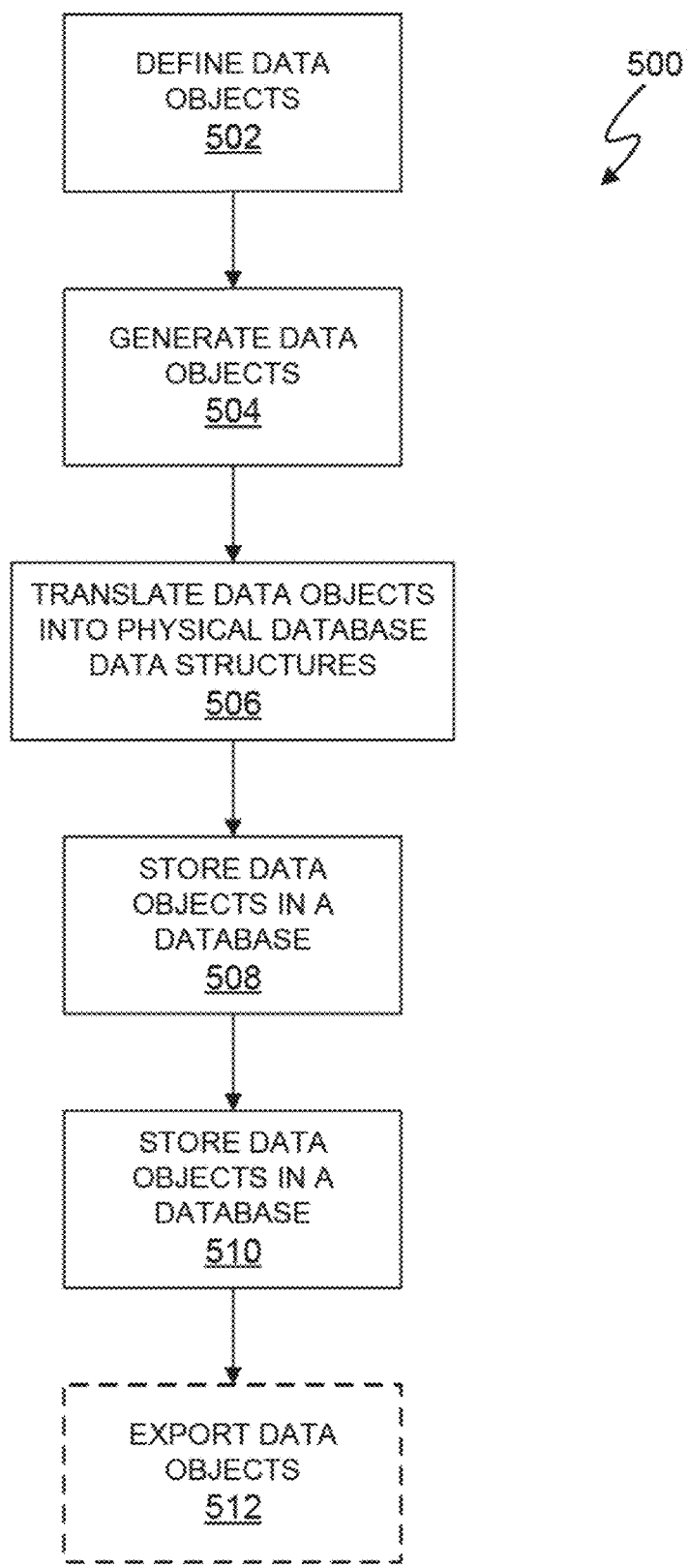
FIG. 5 depicts an exemplary data object design method 500.

FIG. 4 depicts an exemplary data object design system 400 that includes an enhanced data modeling tool 402 representing a technologically improved data modeling tool. FIG. 5 depicts an exemplary data object design method 500. Referring to FIGS. 4 and 5, the data modeling tool 402 includes a data object generator 404 that allows a user of the data modeling tool 402 to generate data objects 406. In at least one embodiment, the data modeling tool 402 includes one or more mechanisms to generate the data objects 406.

Figure 6:
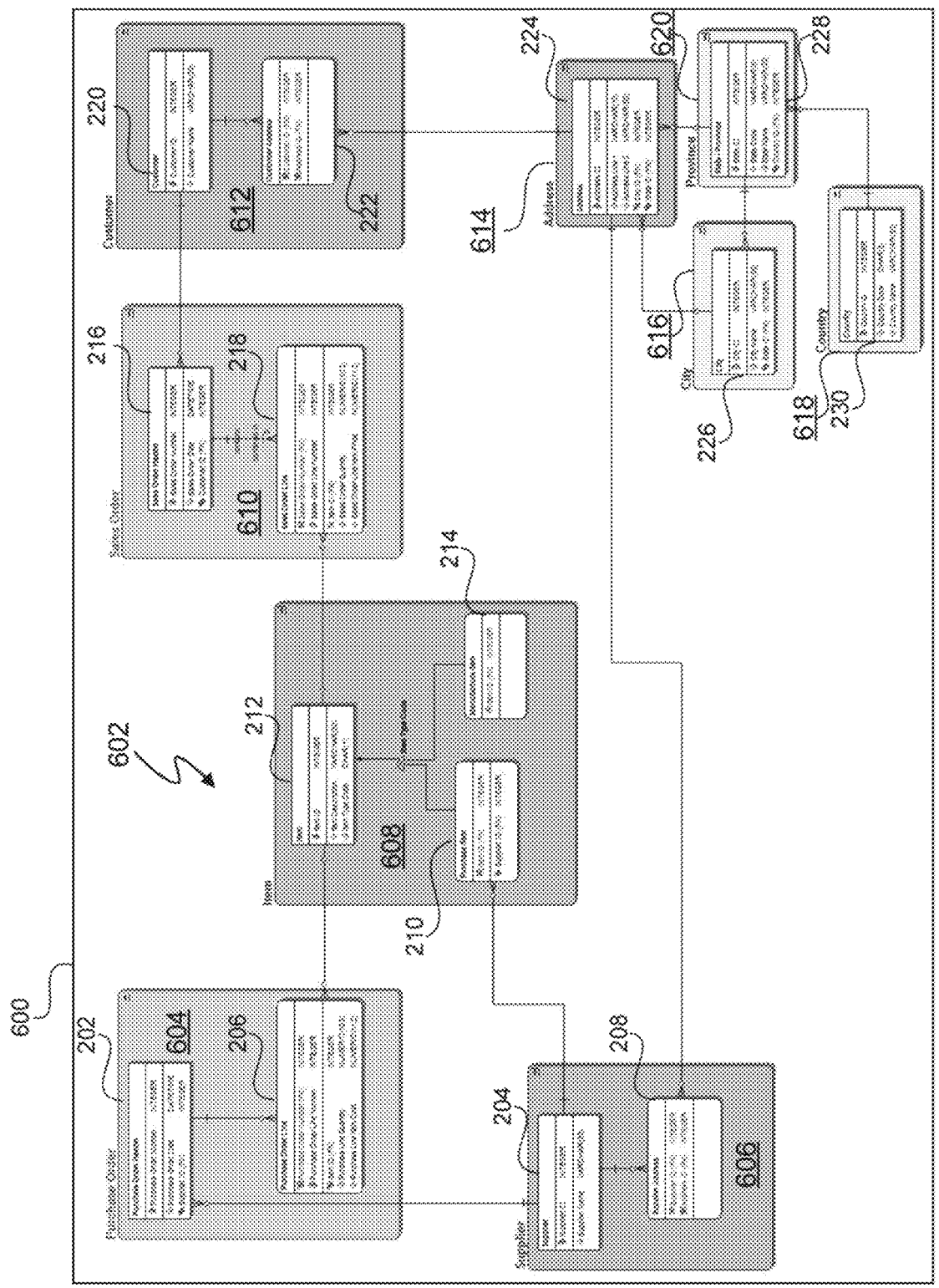
FIG. 6 depicts a diagrammatic, visual data object creation user interface.

FIG. 6 depicts a diagrammatic, visual data object creation user interface (UI) 600 that represents at least one embodiment of a mechanism the data object generator 404 can utilize to generate the data objects 406. In at least one embodiment, the data object generator 404 and UI 600 are far more than just a drawing construct. Each of data objects 604-620 includes respective metadata, and the data model 600 contains information regarding each of the data objects 604-620 and the tables/data entities contained in each of the particular data objects 604-620.

Figure 1:
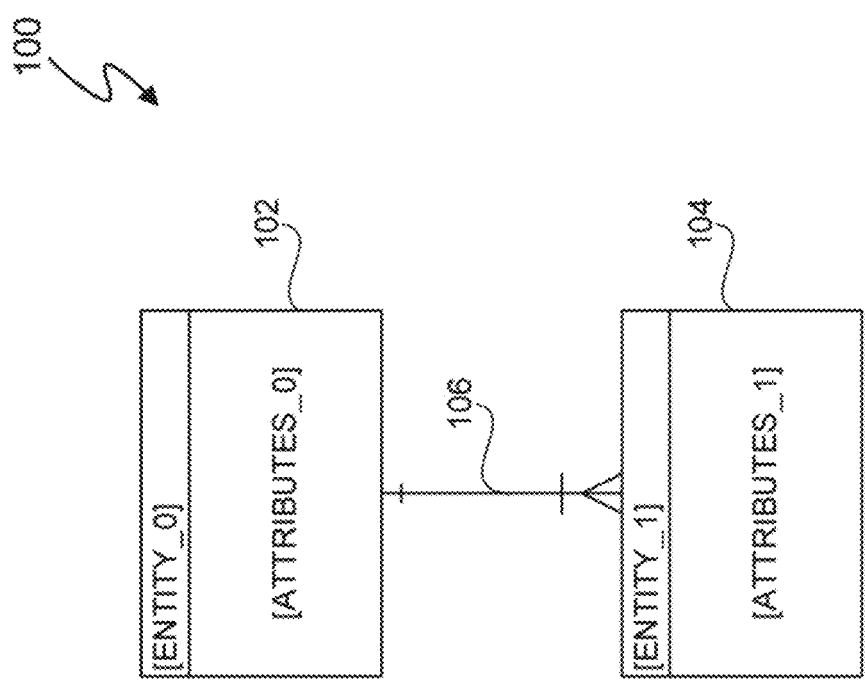
FIG. 1 (labeled prior art) depicts an exemplary data model.
Figure 2:
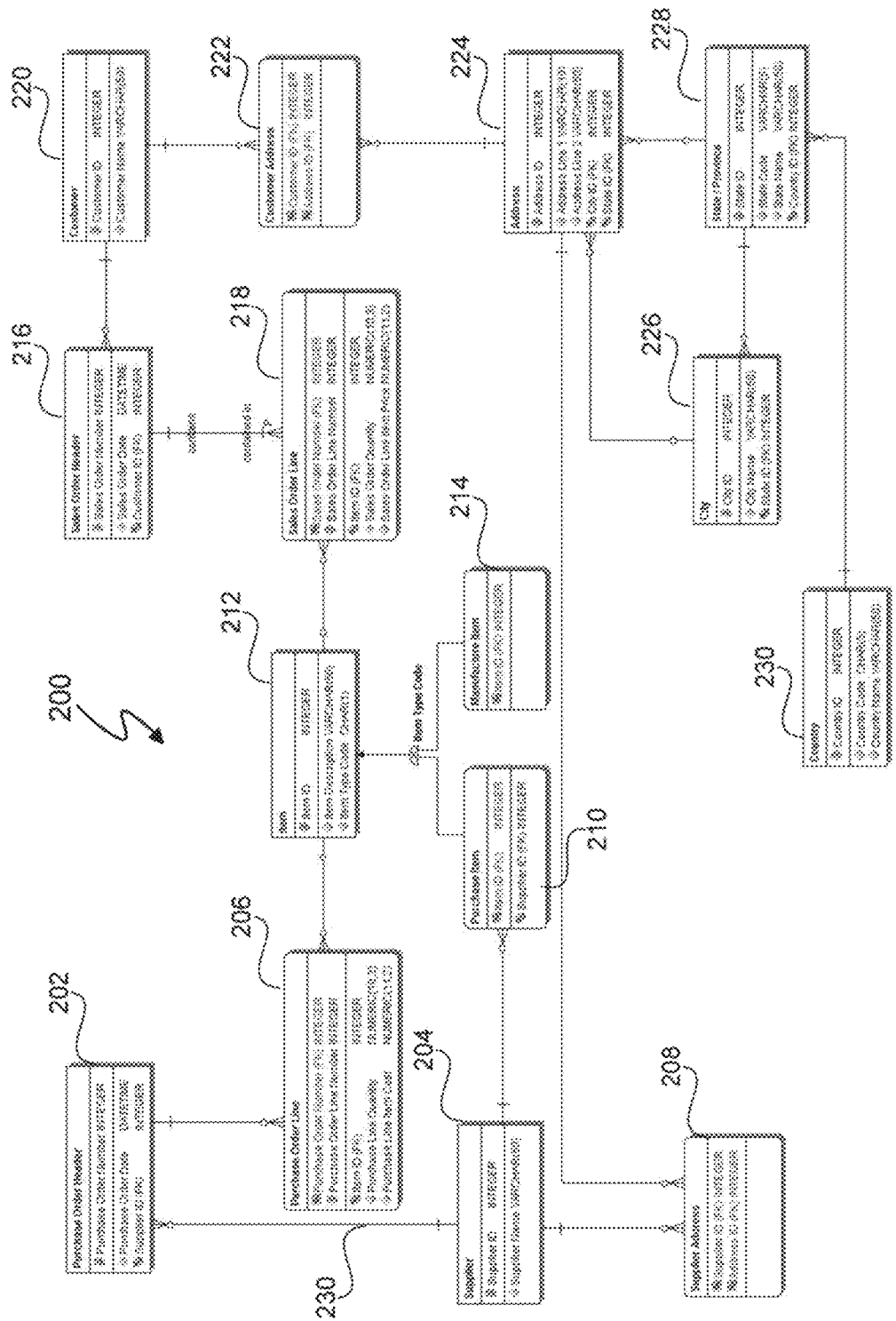
FIG. 2 (labeled prior art) depicts an exemplary supplier/order data model.
Figure 3:
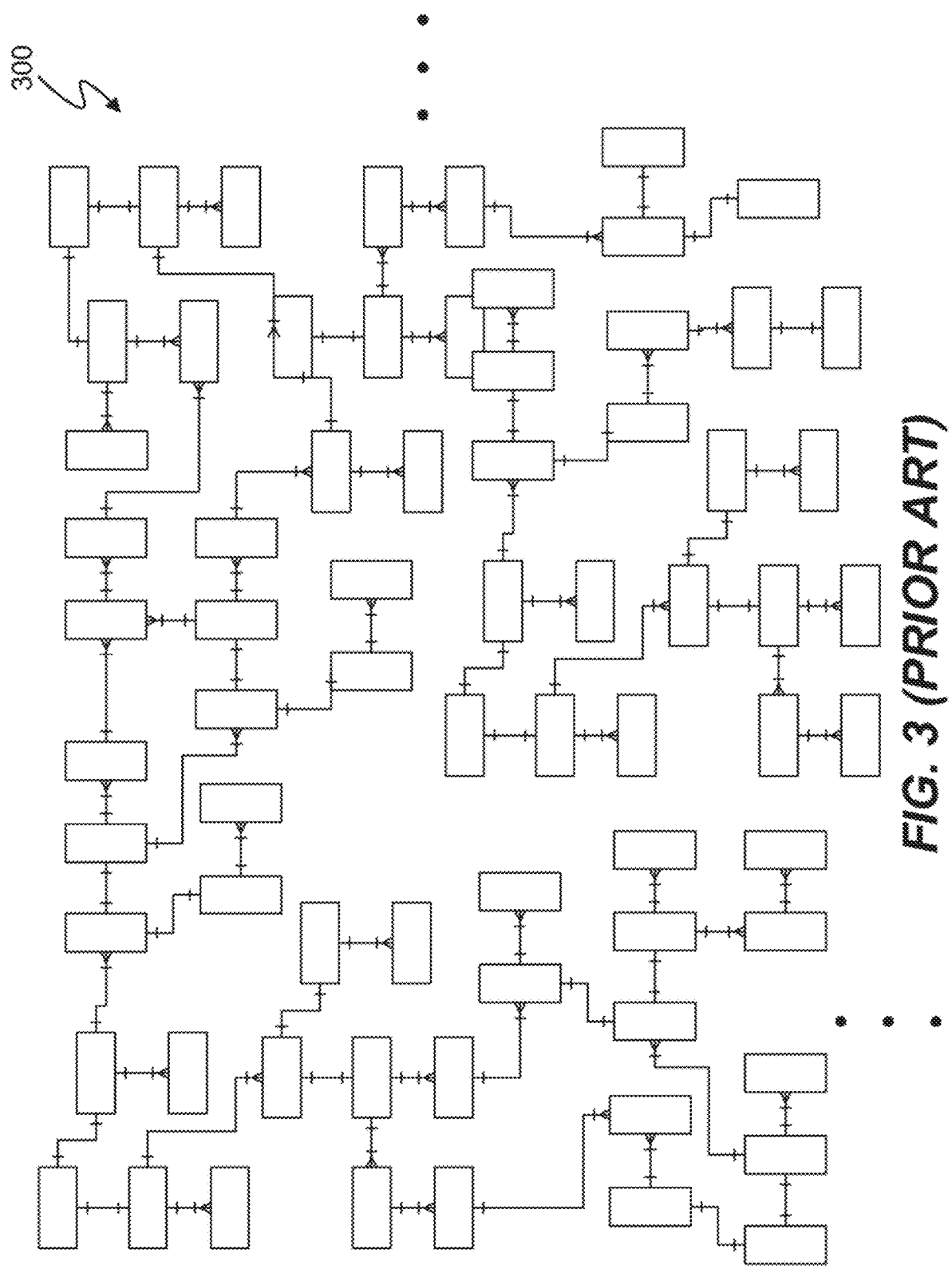
FIG. 3 (labeled prior art) depicts an exemplary more complex data model.

Referring to FIGS. 4-6, the UI 600 represents one embodiment of the user interface 408 and displays a data model 602 that includes, for illustrative and comparative purposes, the same data entities as data model 200 (FIG. 2). The data object generator 404 provides the UI 600 and, in one embodiment, operation 502 allows the user of the data modeling tool 402 to visually define data objects 604 by, for example, rearranging and framing data entities into containers represented by eight exemplary data objects 604-620. The exterior shell of each of data objects 604-620 is not just a visual containment. In at least one embodiment, the data object generator 404 captures the information contained in each contained data entity. The particular information is a matter of design choice and includes, for example, one or more attributes of the entity represented by the data entity, dates, times, keys, and identifiers. For example, data object 604 captures that (i) the data entity 202 is a Purchase Order data entity with a Purchase Order number integer attribute, a date/time Purchase Order Date, and a Supplier ID integer, foreign key attribute and (ii) the data entity 206 is a Purchase Order Line data entity with attributes of Purchase Order Number as a foreign key, integer, Purchase Order Line Number as an integer, Item ID as a foreign key, integer, Purchase Line Quantity with a numeric property, and Purchase Line Item Cost with a numeric property. The particular selection of data entities to be contained is a matter of design choice. In at least one embodiment, the data modeler selects the data entities in accordance with a logical relationship between data entities. For example, the Purchase Order data object 604 contains the Purchase Order Header data entity and the Purchase Order Line data entity, the Supplier data object 606 contains the Supplier data entity and the Supplier Address data entity, and so on. In at least one embodiment, the data object generator 404 preserves the relationships between the contained data entities. Additionally, the number of data entities selected for containment within a data object is also a matter of design choice. For example, the Item data object 608 contains three data entities, namely the Item data entity, the Purchase Item data entity, and the Manufacture Item data entity. The Address data object 614, the City data object 616, the Country data object 618, and the Province data object 620 include only one data entity. Additionally, in at least one embodiment, the data model 600 contains all data entities in data objects. In at least one embodiment (not shown), the data model 600 includes a combination of one or more data objects and one or more data entities. As a matter of design choice, a data entity can exist without belonging to a data object. However, in at least one embodiment, in a given model, a data entity may be contained in at most one data object. In at least one embodiment, in operation 504, the data object generator 404 generates all the data objects 604-620, which are collectively represented as data objects 406. In at least one embodiment, data objects 406 includes all the definitions associated with each of the data objects 604-620, such as an identifier for each of the included data entities, and all the definitions associated with each data entity, such as the identifier, attributes, and relationship(s) with one or more other data entities. In at least one embodiment, a data object may also contain a definition, supporting notes, and additional metadata based on design choices of the data architect. In at least one embodiment, the data objects 604-620 also includes any uncontained data entities.

In operation 506, the data object-to-physical database translator 410, which is included in the data modeling tool 402, translates the data objects into database structures and, in operation 508, stores the electronic, physical database data structures, such as database tables, in the database 412. In at least one embodiment, when a data object is added to the data model 602, the data object-to-physical database translator 410 automatically adds all the tables represent by the data object and the data entities contained therein.

Database 412 is instantiated in a physical, non-transitory memory (not shown). In at least one embodiment, the database 412 is a relational database, such as SQL server 2016. In at least one embodiment, the data object-to-physical database translator 410 defines the data objects 406 in a standard data definition language (DDL) that defines the data structure of the data objects 406 for implementation in a relational database and stores the translated data objects in database 412. Additionally, data objects are not limited to relational databases. For example, non-SQL, non-relational database (NoSQL) structures, such as MongoDB with generation of JavaScript Object Notation (JSON) and Hive tables with generation of HiveQL DDL, can also be contained in data objects. For example, MongoDB objects with generation of JSON, and Hive tables with generation of HiveQL DDL. Data objects 406 can be used in logical and/or physical models. In at least one embodiment, when generating DDL (SQL) for a physical model, the data objects 406 have no impact on the generated SQL. In a logical model, the data objects 406 contain data entities. In a physical model a data object contains tables. When generating a physical model from a logical model in ER/Studio Data Architect by Idera, Inc. of Houston, Tex., the data objects 406 are created in the physical model of the database 412 as well, encapsulating the tables that corresponded to the relevant entities in the logical model.

The properties of the data objects 406 are a matter of design choice. In at least one embodiment, the data objects 406 can be copied and translated into other forms in addition or instead of direct translation into a database 412. For example, in optional operation 510, a data object exporter 414 converts the data objects 406 into exportable data objects 416. In at least one embodiment, the data object exporter 414 converts the data objects 406 exports the data objects 416 in an exportable format, such as an extensible markup language (XML) document. In at least one embodiment, an XML version of the exportable data objects utilizes available constructs to represent the definitions of data base objects including the definitions of the contained data entities. In at least one embodiment, the data object exporter 414 exports the exportable data objects 416 to another enhanced data modeling tool 418 that is capable of utilizing the exportable data objects 416.

Figure 7:
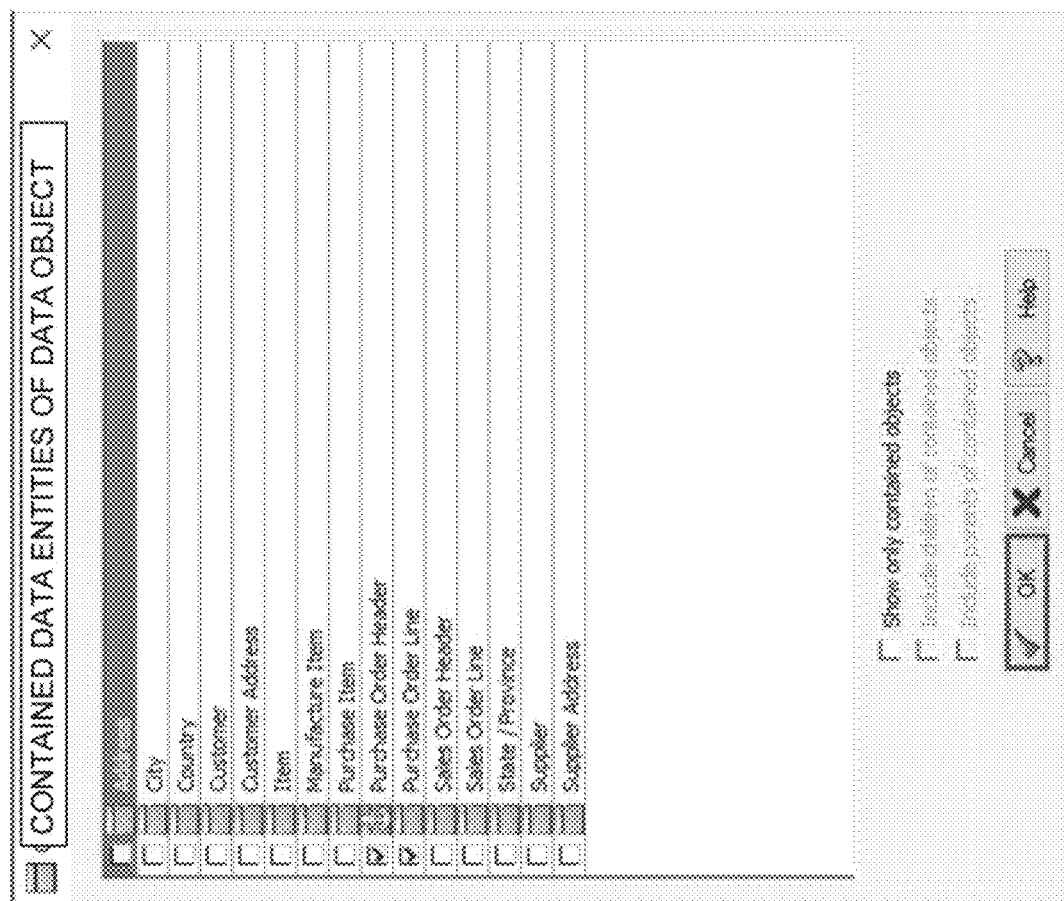
FIG. 7 depicts an exemplary data entity selector.
Figure 8:
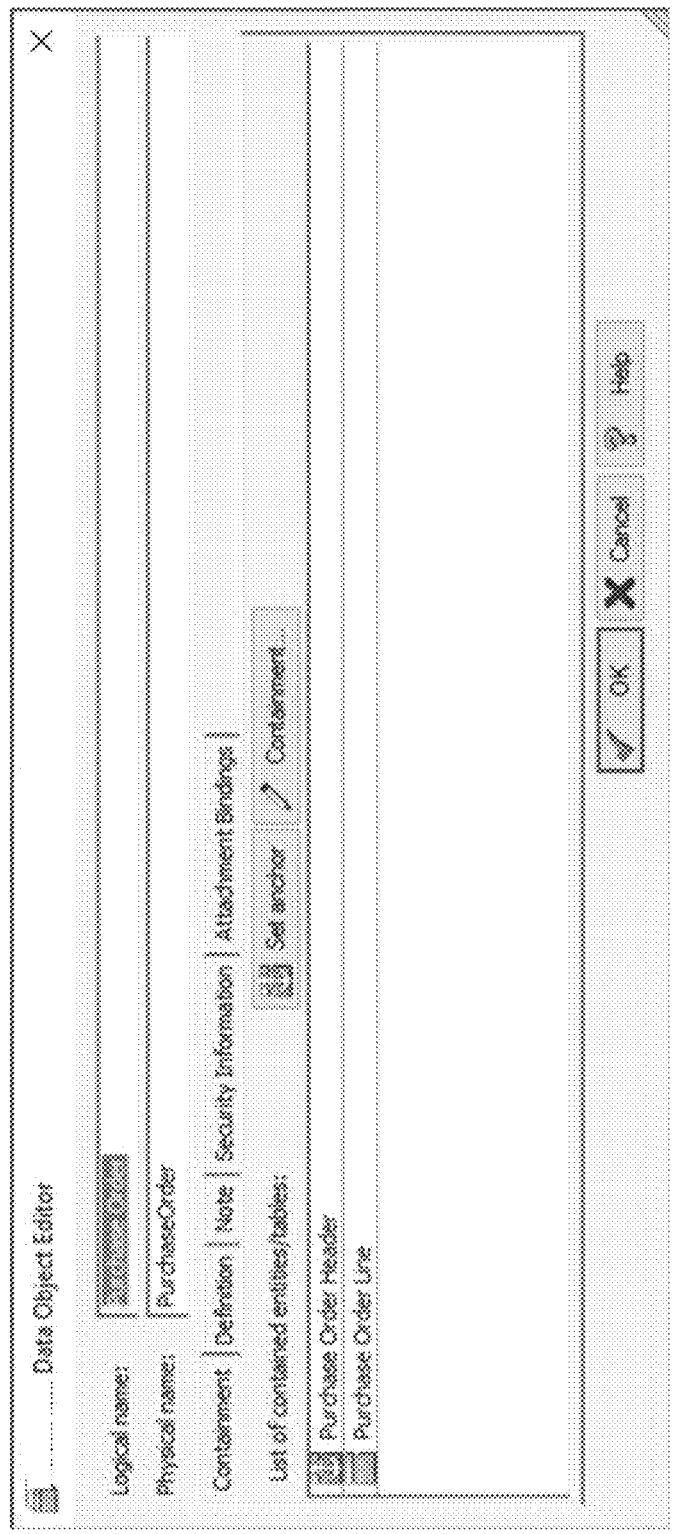
FIG. 8 depicts an exemplary data object editor.

FIG. 7 depicts an exemplary data entity selector 700, and FIG. 8 depicts an exemplary data object editor 800. Together, the exemplary data entity selector 700 and exemplary data object editor 800 represent one embodiment of the data object generator 404. As previously discussed, in one embodiment of operation 502, a user can visually define data objects 604 by framing the data objects 604 in a user interface. Data object generator 700 represents another embodiment of defining data objects 604 in operation 502.

In the data object generator 700, a user interface 702 depicts each instantiated data entity 202-230. A user selects the data entity to include in a data object. In at least one embodiment, for inclusion within a data object, a data entity belongs to only one data object within a model.

The data object editor 800 depicts which data entities are contained by the data object and allows a user to define the data object, which in the exemplary embodiment is the Purchase Order database object 604. In at least one embodiment, the data object editor 800 also allows a user to further define the data object, make notes, define security information, and define attachment bindings. In at least one embodiment, the data object editor 800 also allows a user to define an anchor (root) entity in a data object. The anchor (root) is the top-level entity in a hierarchy of entities/relationships contained within the data object. In FIG. 7, the Purchase Order Header represents an anchor entity as indicated by the anchor symbol on Purchase Order Header.

Figure 9:
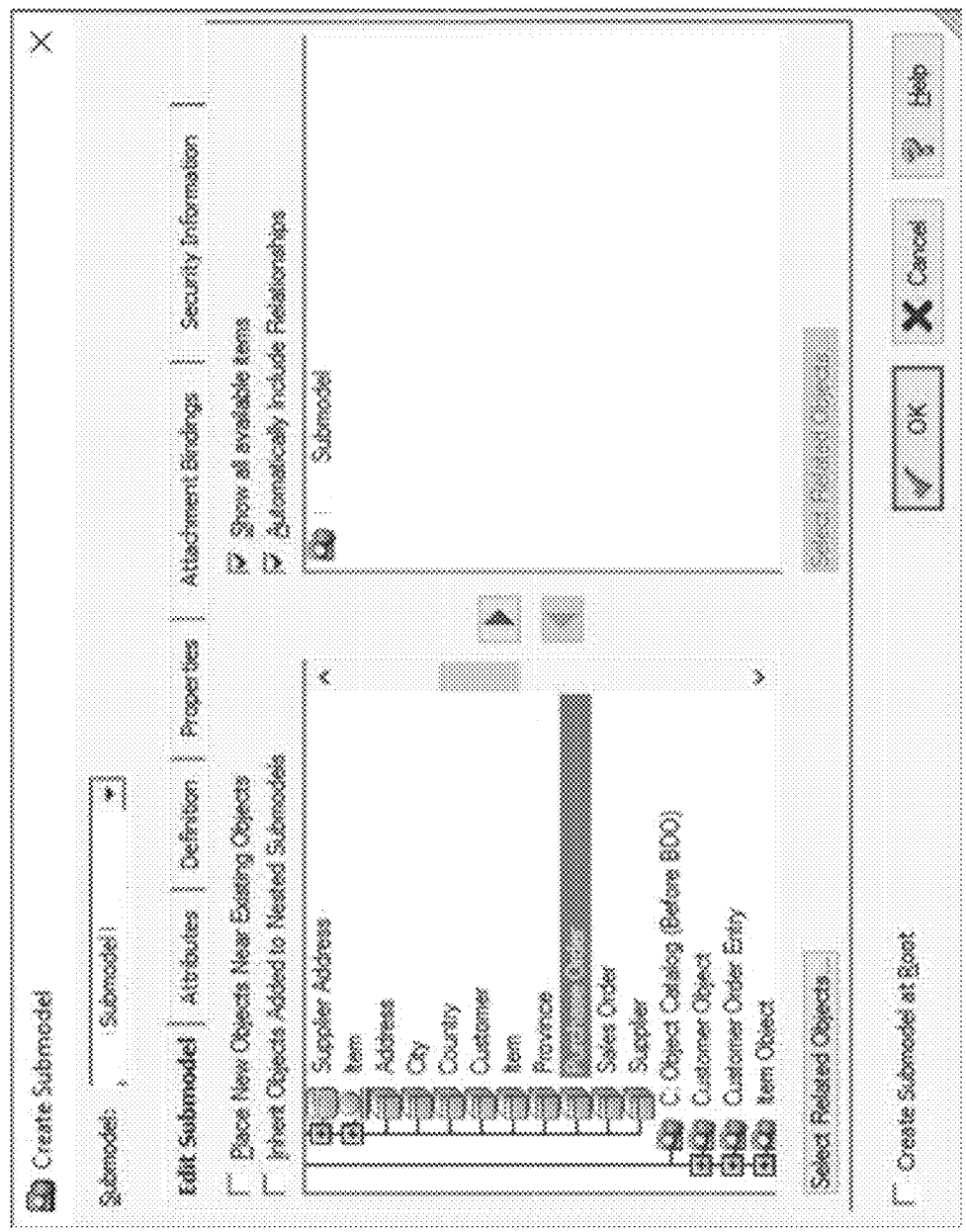
FIG. 9 depicts an exemplary data submodel editor.

FIG. 9 depicts an exemplary data submodel editor 900 for at least one embodiment of the data object generator 404. Complex data models often include many data submodels (subject areas) to represent different viewpoints or business areas. A given data entity or set of data entities, represented using a table or set of tables will typically be used in many different data submodels. When a user utilizes the data submodel editor 900 to create a new submodel or edit an existing one data submodel, a user can select a data object for inclusion in that submodel. In at least one embodiment, by default the data submodel editor 900 adds the selected one or more data objects and the contained entities to the data submodel. In at least one embodiment, each data object is an object within the data model 602, and the data object can be used in as many submodels within the model file as desired. The submodels represent different viewpoints of how collections of entities and data objects are utilized. When creating a new submodel, or editing an existing one, a data object can be selected for inclusion in that submodel.

Figure 10:
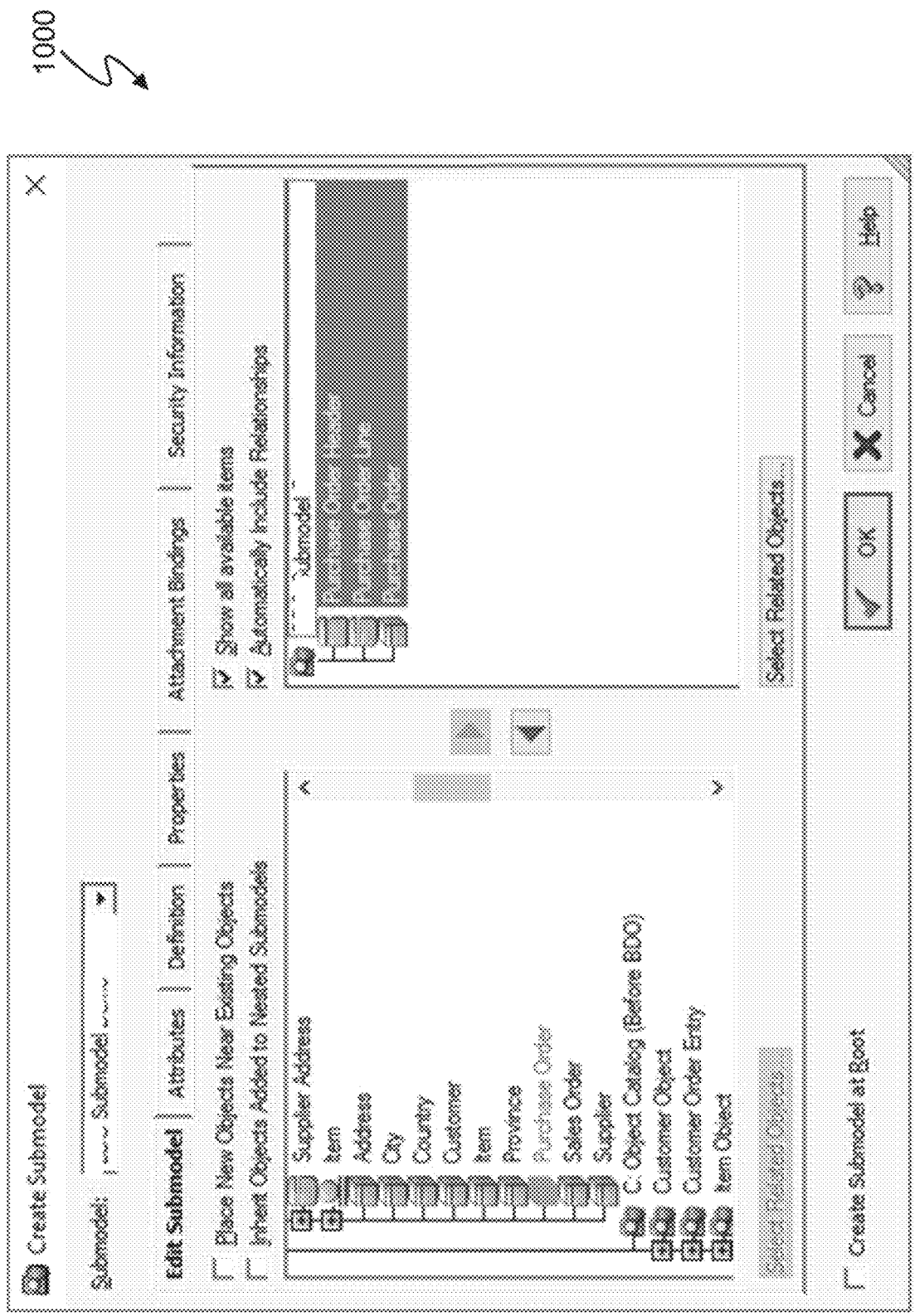
FIG. 10 depicts the generation of the data submodel that contains an exemplary data object.

FIG. 10 depicts the generation of the data submodel that contains the Purchase Order data object 604 and contained data entities Purchase Order Header 202 and Purchase Order Line 206.

Figure 11:
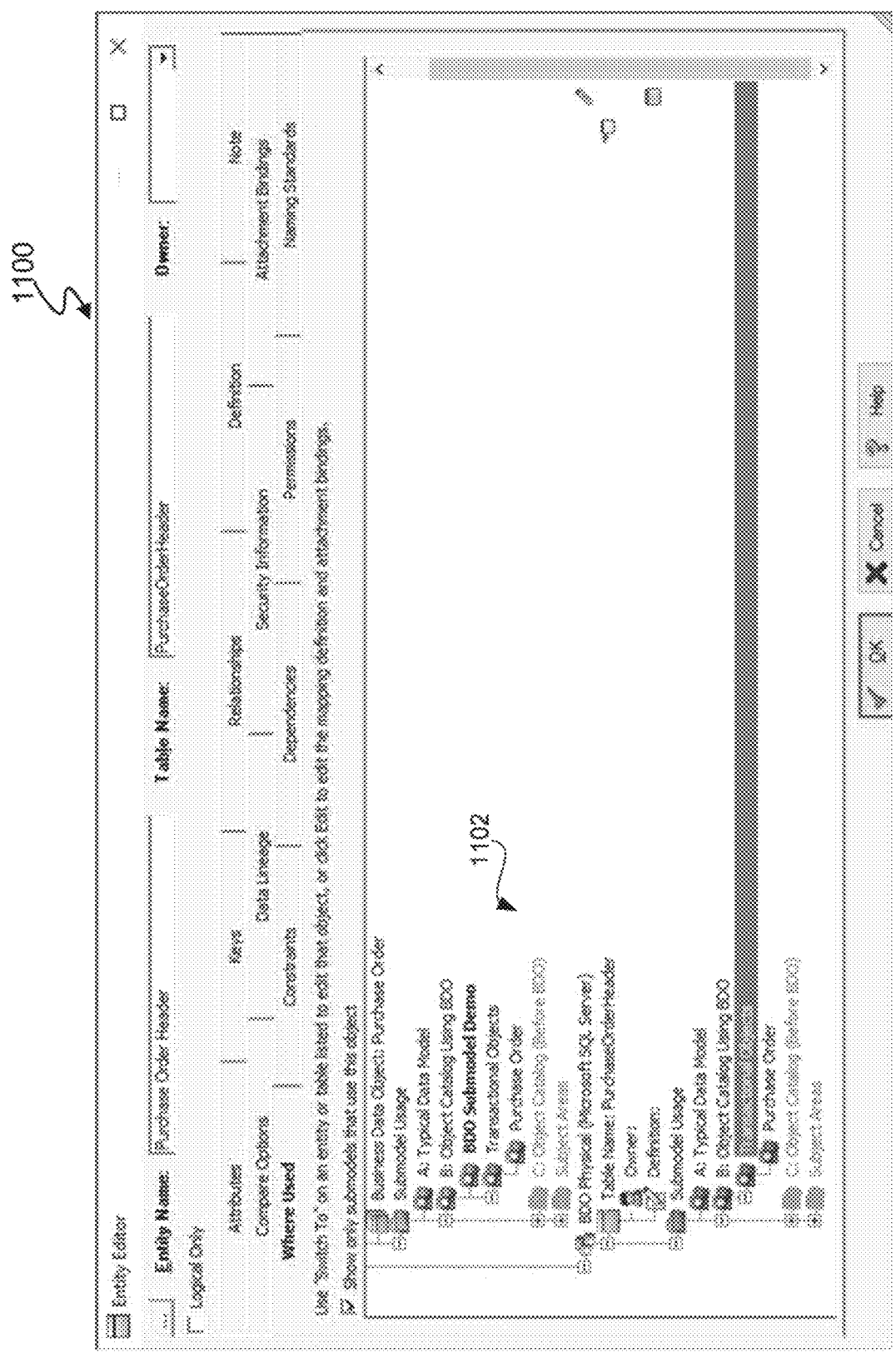
FIG. 11 depicts an exemplary data entity editor.

FIG. 11 depicts an exemplary data entity editor 1100 that can be included in the data modeling tool 402 to allow a user to edit a data entity and depict data objects and data entities. The data entity editor 1100 provides a substantial productivity boost for data modelers. The data entity editor 1100 also depicts the data object that contains data entity in a "where-used" display 1102.

Figure 12:
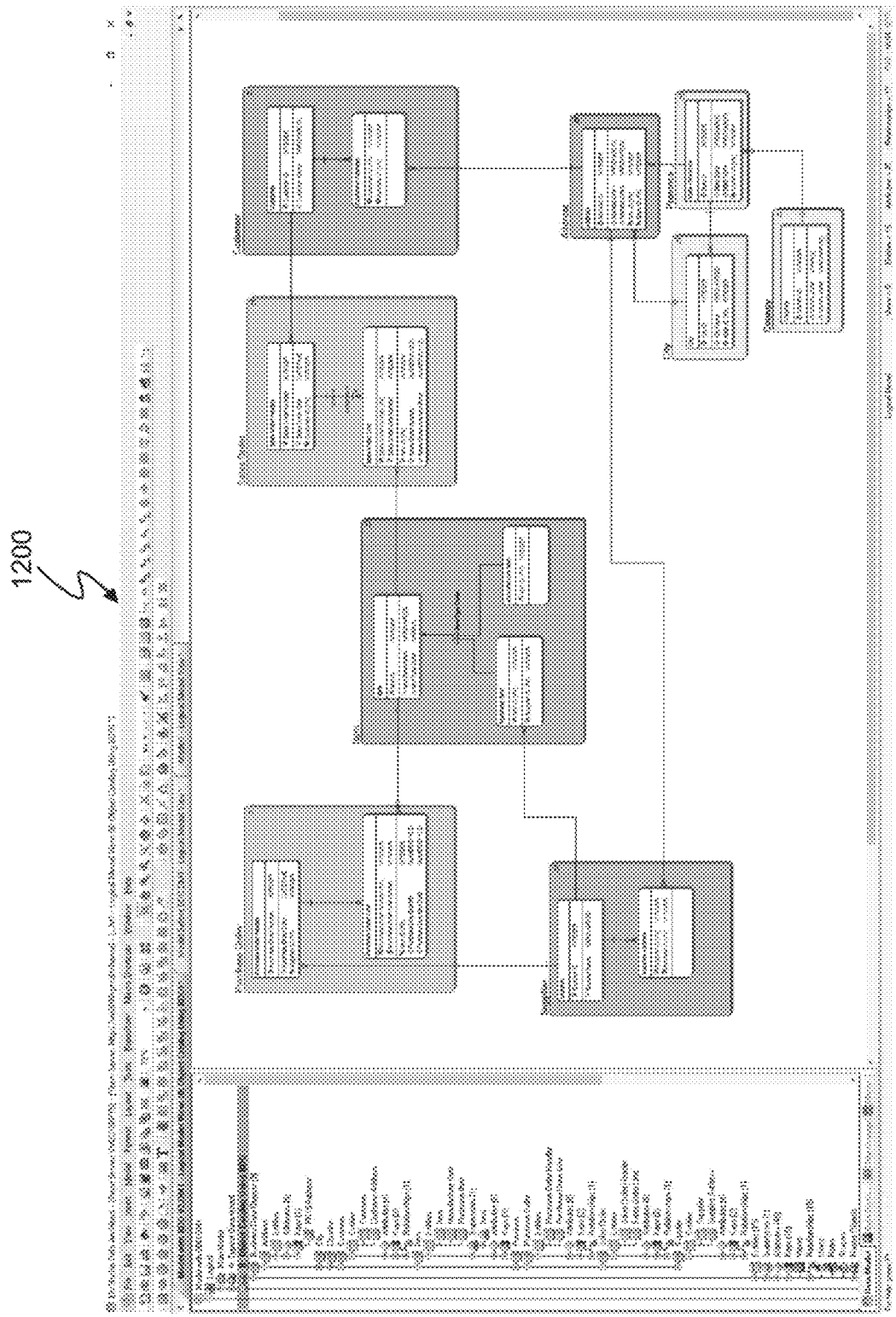
FIG. 12 depicts a full studio of a data object generator.

FIG. 12 depicts a full studio 1200 of the data object generator 404 that provides a comprehensive view of the data objects and contained data entities.

Figure 13:
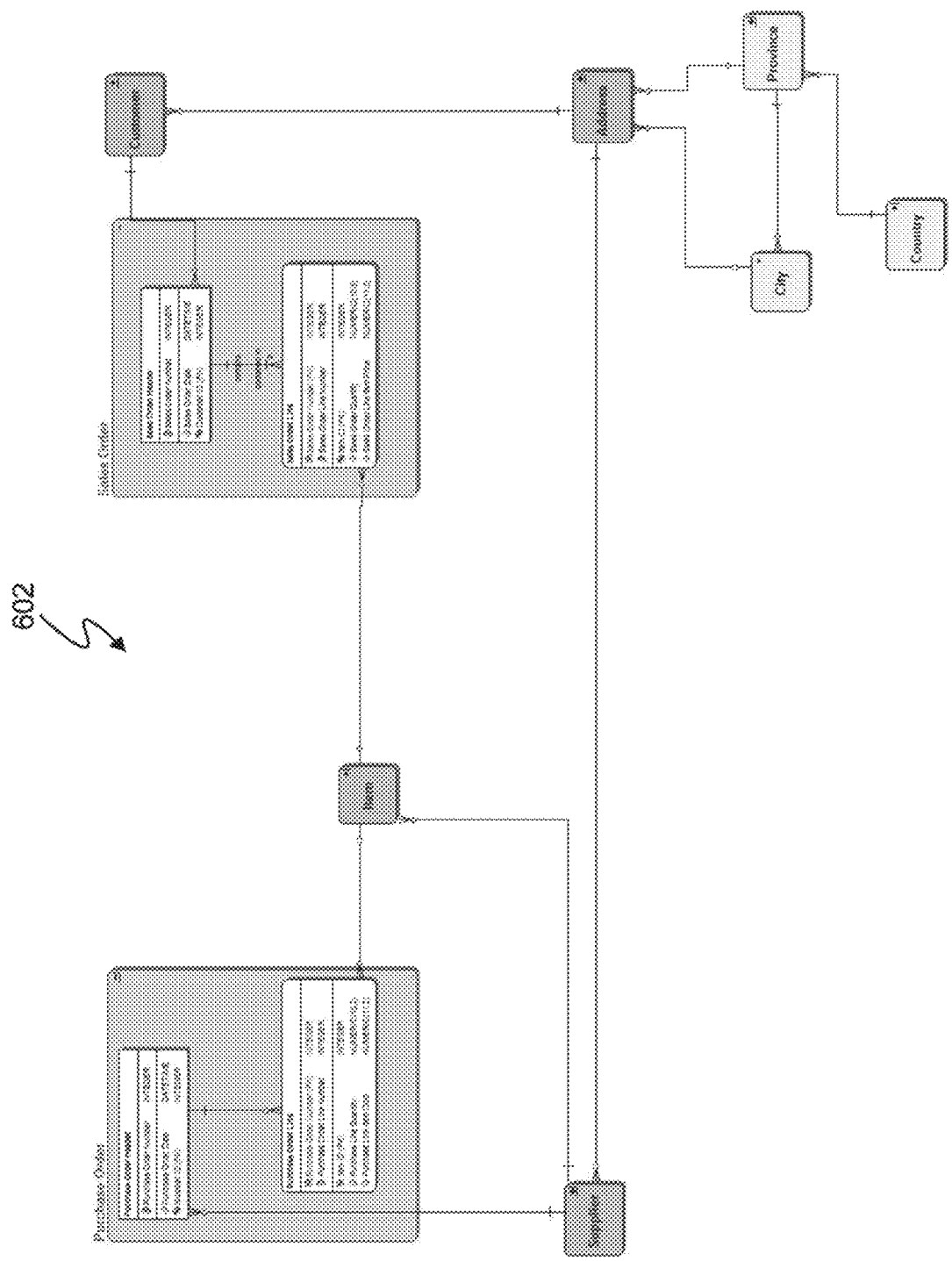
FIG. 13 depicts the collapsible property of selected data objects in a data model.

FIG. 13 depicts the collapsible property of selected data objects in the data model 602. The particular properties of a data object are a matter of design choice. In at least one embodiment, a data entity belongs to only one data object, and the data object containing the data entity 'owns' the entity from a data persistence perspective. In at least one embodiment, frames in the visual representation of a data model, such as UI 600, can be used to represent subject areas, which could then contain zero or more data objects within the subject area. When a data object is collapsed in the diagram view to hide the underlying entities, the relationships between the data entities and data objects is preserved and shown as connected to the frame (border) of the collapsed data object. Data objects can be used in logical and/or physical models. In a logical model, the data objects contain entities. In a physical model a data object contains tables. When generating a physical model from a logical model in ER/Studio Data Architect, the data objects are created in the physical model as well, encapsulating the tables that corresponded to the relevant entities in the logical model. The data objects are also reusable objects that can be used to quickly build submodels.

Figure 14:
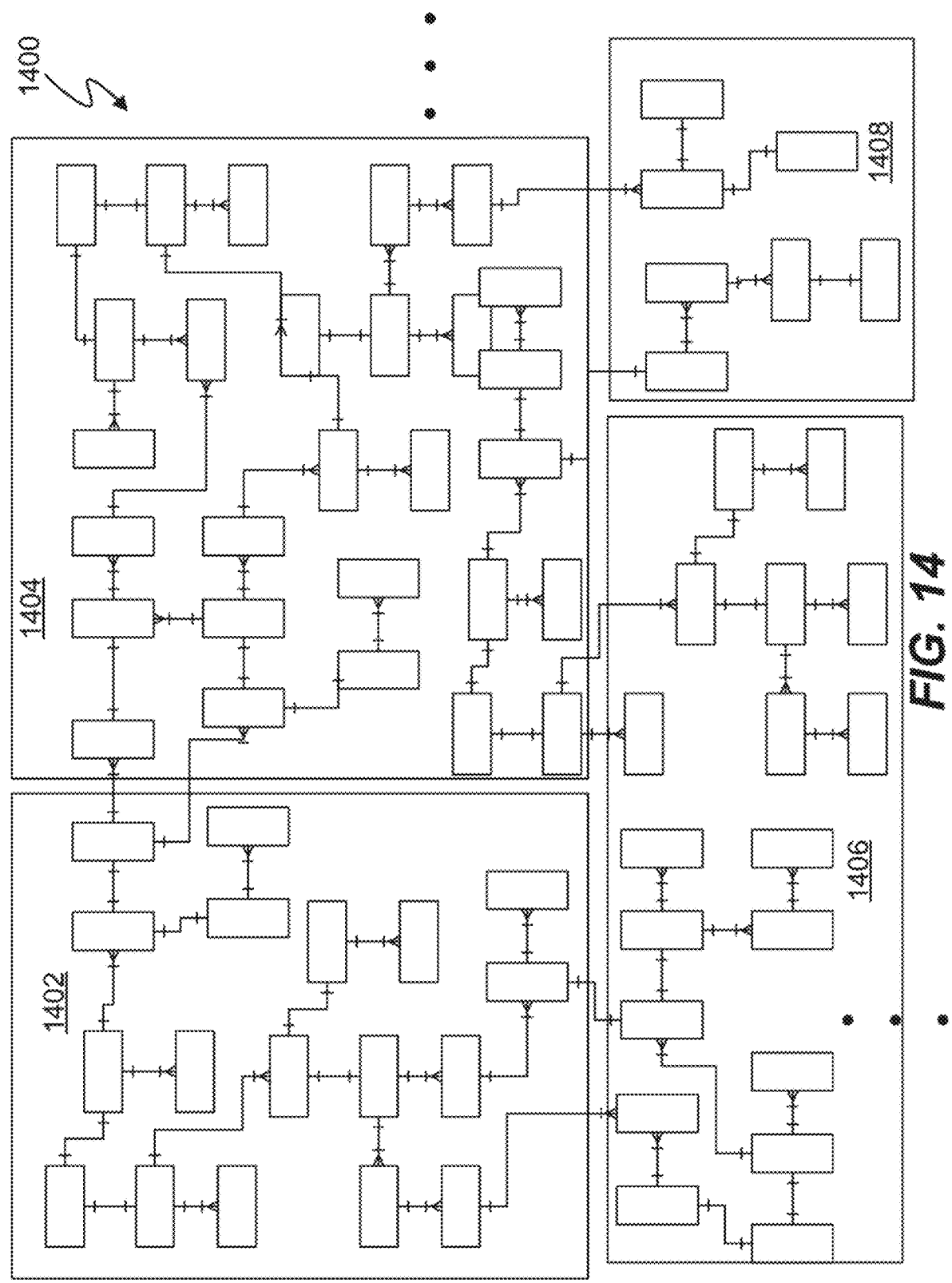
FIG. 14 depicts the conceptual and technological simplification of a complex data model.

FIG. 14 depicts the conceptual and technological simplification of a complex data model 1400 through the enhanced data modeling tool 202 and introduction of data objects, such as data objects 1402-1408.

Figure 15:
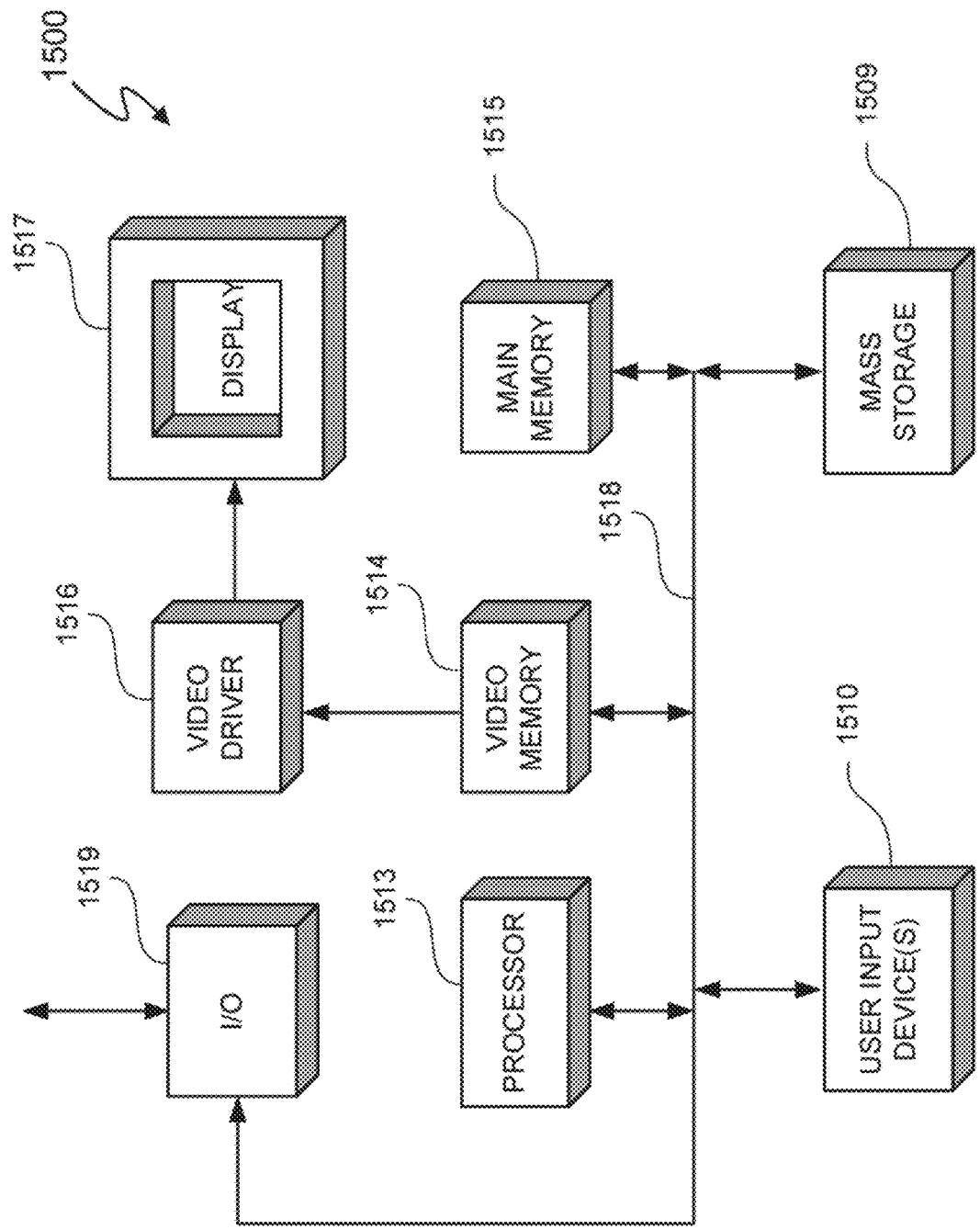
FIG. 15 depicts an exemplary computer system.

Embodiments of the enhanced data modeling tool 402 can be implemented on a specially programmed computer system such as a special-purpose, technologically improved computer 1500 illustrated in FIG. 15. Input user device(s) 1510, such as a keyboard and/or mouse, are coupled to a bi-directional system bus 1518. The input user device(s) 1510 are for introducing user input to the computer system and communicating that user input to processor 1513. The computer system of FIG. 15 generally also includes a non-transitory video memory 1514, non-transitory main memory 1515, and non-transitory mass storage 1509, all coupled to bi-directional system bus 1518 along with input user device(s) 1510 and processor 1513. The mass storage 1509 may include both fixed and removable media, such as a hard drive, one or more CDs or DVDs, solid state memory including flash memory, and other available mass storage technology. Bus 1518 may contain, for example, 32 of 64 address lines for addressing video memory 1514 or main memory 1515. The system bus 1518 also includes, for example, an n-bit data bus for transferring DATA between and among the components, such as CPU 1509, main memory 1515, video memory 1514 and mass storage 1509, where "n" is, for example, 32 or 64. Alternatively, multiplex data/address lines may be used instead of separate data and address lines.

I/O device(s) 1519 may provide connections to peripheral devices, such as a printer, and may also provide a direct connection to a remote server computer systems via a telephone link or to the Internet via an ISP. I/O device(s) 1519 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

The enhanced data modeling tool 402 in one embodiment is implemented as a computer program. Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 1509, into main memory 1515 for execution. Computer programs may also be in the form of electronic signals modulated in accordance with the computer program and data communication technology when transferred via a network.

The processor 1513, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1515 is comprised of dynamic random access memory (DRAM). Video memory 1514 is a dual-ported video random access memory. One port of the video memory 1514 is coupled to video amplifier 1516. The video amplifier 1516 is used to drive the display 1517. Video amplifier 1516 is well known in the art and may be implemented by any suitable means. This circuitry converts pixel DATA stored in video memory 1514 to a raster signal suitable for use by display 1517. Display 1517 is a type of monitor suitable for displaying graphic images. The computer system described above is for purposes of example only.

Thus, a data object design system and method facilitates and generates creation of data objects to contain and, thus, contain data structures within the data objects. The data objects and interaction between the data objects implement a higher level of abstraction between data objects and data entities. Particularly for complicated, sophisticated data models, the data objects support an increased usability, efficiency, and comprehension of a data modeling system.

Although embodiments have been described in detail, it should be understood that various changes, substitutions, and alterations can be made hereto without departing from the spirit and scope of the invention as defined by the appended claims.

What is claimed is:

1. A method of utilizing a data modeling tool executing in a machine to generate data objects to contain data entities within the data objects of a data modeling system, the method comprising:
   (a) selecting a first data entity for containment within a data object, wherein:
      (i) the data entity includes data entity definitions comprising entity information about the entity represented by the data entity, an identifier, and relationship information representing a relationship with at least one other data entity;
      (ii) the data entity is a data structure that represents at least data attributes; and
      (iii) the data entity is separate from actual data values of the data attributes;
   (b) capturing the first data entity, including the data entity definitions included with the first data entity, in the data object to contain the first data entity within the data object;
   repeating (a) and (b) at least once to add one or more data entities to the data object and generate one or more additional data objects, wherein each data object includes multiple data entities, and each of the data entities includes the relationship information with at least one other data entity;
   preserving in each data object relationships between data entities captured in each data object; and
   translating the data objects into data structures for storing in a database.

2. The method of claim 1 further comprising:
   storing the database structures in the database instantiated in physical, non-transitory memory.

3. The method of claim 1 further comprising:
   converting the data objects into exportable format utilizing constructs to represent definitions of the data objects including definitions of each data entity contained in the data objects; and
   exporting the converted data objects to another data modeling tool.

4. The method of claim 1 further comprising:
   editing data entities contained in data objects.

5. The method of claim 1 further comprising:
displaying an interactive visualization of the data objects and data entities contained in the data objects; and
collapsing at least one of the data objects while preserving the relationships between data entities and data objects.

6. The method of claim 1 wherein selecting a first data entity for containment within a data object further comprises:
displaying a user interface that includes a display of multiple data entities; and
defining the data objects and the data entities contained by the data objects by framing data entities into containers, wherein each container represents a data object.

7. The method of claim 1 further comprising:
defining each data object including security information and attachment bindings between two or more data objects.

8. The method of claim 1 wherein each data entity is contained by only one data object.

9. The method of claim 1 wherein the entity information comprises an entity name and entity attributes.

10. The method of claim 1 wherein the data object includes a second data entity, the method further comprising:
selecting the first data entity in accordance with a logical relationship between the first data entity and a second data entity included in the data object.

11. A data modeling system of a database comprising:
a processor;
a memory comprising code executable by the processor to generate a data modeling tool that is configured to:
(a) receive a selection of a first data entity for containment within a data object, wherein:
(i) the data entity includes data entity definitions comprising entity information about the entity represented by the data entity, an identifier, and relationship information representing a relationship with at least one other data entity;
(ii) the data entity is a data structure that represents at least data attributes; and
(iii) the data entity is separate from actual data values of the data attributes;
(b) capture the first data entity, including the data entity definitions included with the first data entity, in the data object to contain the first data entity within the data object;
repeat (a) and (b) at least once to add one or more data entities to the data object and generate one or more additional data objects, wherein each data object includes multiple data entities, and each of the data entities includes the relationship information with at least one other data entity;
preserve in each data object relationships between data entities captured in each data object; and
translate the data objects into data structures for storing in a database.

12. The system of claim 11 wherein the data modeling tool is further configured to:
store the database structures in the database instantiated in physical, non-transitory memory.

13. The system of claim 11 wherein the data modeling tool is further configured to:
convert the data objects into exportable format utilizing constructs to represent definitions of the data objects including definitions of each data entity contained in the data objects; and
export the converted data objects to another data modeling tool.

14. The system of claim 11 wherein the data modeling tool is further configured to:
edit data entities contained in data objects.

15. The system of claim 11 wherein the data modeling tool is further configured to:
display an interactive visualization of the data objects and data entities contained in the data objects; and
collapse at least one of the data objects while preserving the relationships between data entities and data objects.

16. The system of claim 11 wherein to select a first data entity for containment within a data object further comprises:
display a user interface that includes a display of multiple data entities; and
define the data objects and the data entities contained by the data objects by framing data entities into containers, wherein each container represents a data object.

17. The system of claim 11 wherein the data modeling tool is further configured to:
define each data object including security information and attachment bindings between two or more data objects.

18. The system of claim 11 wherein each data entity is contained by only one data object.

19. The system of claim 11 wherein the entity information comprises an entity name and entity attributes.

20. The system of claim 11 wherein the data object includes a second data entity, the wherein the data modeling tool is further configured to:
select the first data entity in accordance with a logical relationship between the first data entity and a second data entity included in the data object.

* * * * *